United States Patent
Ferraro Esparza et al.

(10) Patent No.: US 6,839,421 B2
(45) Date of Patent: Jan. 4, 2005

(54) METHOD AND APPARATUS TO CARRY OUT RESOLUTION OF ENTITY IDENTIFIER IN CIRCUIT-SWITCHED NETWORKS BY USING A DOMAIN NAME SYSTEM

(75) Inventors: Victor Ferraro Esparza, Madrid (ES); Miguel Cobo, Stockholm (SE); Robert Khello, Norsborg (SE); Isabel Plata Andrés, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 09/984,265

(22) Filed: Oct. 29, 2001

(65) Prior Publication Data

US 2003/0081754 A1 May 1, 2003

(51) Int. Cl.[7] .......................... H04L 12/56; H04L 12/66; H04M 3/42; H04M 7/00; H04Q 7/20
(52) U.S. Cl. .................. 379/220.01; 370/259; 370/354; 370/389; 379/201.01; 379/221.13; 379/900; 455/433; 455/445; 709/245
(58) Field of Search ................................ 370/259, 352, 370/353, 354, 355, 356, 357, 389, 401; 379/209.01, 220.01, 221.01, 221.13, 900; 455/433, 445; 709/245

(56) References Cited

U.S. PATENT DOCUMENTS

| | | | |
|---|---|---|---|
| 5,839,072 A | * 11/1998 | Chien | 455/445 |
| 5,854,982 A | 12/1998 | Chambers | 455/445 |
| 5,890,063 A | 3/1999 | Mills | 455/433 |
| 5,974,453 A | 10/1999 | Andersen et al. | 455/445 |
| 6,002,759 A | 12/1999 | Kallioniemi et al. | 379/220.01 |
| 6,021,126 A | 2/2000 | White et al. | 370/352 |
| 6,064,887 A | 5/2000 | Kallioniemi et al. | 709/220 |
| 6,201,965 B1 | 3/2001 | Lauson et al. | |
| 6,469,998 B1 | * 10/2002 | Burgaleta Salinas et al. | 370/338 |
| 2002/0027915 A1 | * 3/2002 | Foti et al. | 370/392 |

OTHER PUBLICATIONS

*Technical Specification* 3GPP TS 23.140 v5.1.0 (Dec. 2001), 3rd Generation Partnership Project; Technical Specification Group Terminals; Multimedia Messaging Service (MMS); Functional description; Stage 2 (Release 5).

Network Working Group, Request for Comments: 2915; Updates: 2168, Category: Standards Track, M. Mealling et al., Sep. 2000, "The Naming Authority Pointer (NAPTR) DNS Resource Record".

*Technical Specification*, 3GPP TS 23.228 v5.3.0 (Jan. 2002), 3rd Generation Partnership Project; Technical Specification Group Services and System Aspects; I'P Multimedia Subsystem (IMS); Stage 2 (Release 5).

*Technical Specification*, 3GPP TS 23.066 v4.0.0 (Mar. 2001), 3rd Generation Partnership Project; Technical Specification Group Core Network; Support of Mobile Number Portability (MNP); Technical realization; Stage 2; (Release 4).

(List continued on next page.)

*Primary Examiner*—Harry S. Hong
(74) *Attorney, Agent, or Firm*—Nixon & Vanderhye P.C.

(57) ABSTRACT

An efficient interface for service exchange is provided between a circuit-switched communications network and a domain naming system (DNS) in a packet-switched communications network. A node in the circuit-switched communications network receives from a first entity a request for a first service involving a second entity associated with a second entity identifier. A message is sent from the circuit-switched network node to a DNS server in the packet-switched network requesting a second service related to the second entity identifier. The result of the second service from the DNS server is used in providing the first service.

44 Claims, 6 Drawing Sheets

OTHER PUBLICATIONS

*ONLINE!*, Mar. 2001, pp. 1–33, XP002192483, Retrieved from the Internet: search.ietf.org/internet-drafts/draft-ietf-enum-e164-gstn-np-03.txt, retrieved on Mar. 8, 2002, M. Foster et al., "Number Portability in the GSTN: An Overview" Internet Draft.

*ONLINE!*, Sep. 2000, pp. 1–7, XP002192484, Retrieved from the Internet: faqs.org/rfcs/rfc2916.html, retrieved on Mar. 8, 2002, P. Faltstrom, "E.164 number and DNS" Request for Comments: 2916.

Individual Submission, Internet Draft, A. Gallant, NeuStar, Inc. Nov. 24, 2000, search.ietf.org/internet-drafts/draft-gallant-enum-ifax-01.txt, printed Jun. 14, 2001, "ENUM, E.164, and Internet Fax".

Network Working Group, Request for Comments: 2915, M. Mealling, Network Solutions, Inc., and R. Daniel, DATAFUSION, Inc., Sep. 2000, ietf.org. rfc/rfc2915.txt?number=2915, printed Jun. 14, 2001, "The Naming Authority Pointere (NAPTR) DNS Resource Record".

Network Working Group, Request for Comments: 2916, P. Faltstrom, Cisco Systems Inc., Sep. 2000, www.ietf.org/rfc/rfc2916.txt?number=2916, "E.164 number and DNS".

Network Working Group, Request for Comments: 1034, P. Mockapetris, ISI, Nov. 1987, ieft.org/rfc/rfc1034.txt?number=1034, "Domain Names—Concepts and Facilities".

Network Working Group, Request for Comments: 1035, P. Mockapetris, ISI, Nov. 1987, ietf.org/rfc/rfc1035.txt?number=1035, "Domain Names—Implementation and Specification", Application Ser. No. 09/899,551, filed Jul. 6, 2001.

International Search Report PCTSE02/01879 dated Aug. 13, 2003.

ITU Telecommunication Standardisation Sector, TD PL/11–, Scope and Number Portability Capability Set 1 Architecture, May 5–22, 1998, pp. 1–46.

ITU Telecommunication Standardisation Sector, TD PL/11–65R1, Scope and Number Portability Capability Set 1 Architecture, May 5–22, 1998, pp. 1–46.

ITU Telecommunication Standardisation Sector, PL/11–66R1, Capability Set 1–Portable Number Call Control for Service Provider Portability, May 11–22, 1998, pp. 1–20.

International Telecommunication Union, International Telecommunication Standardization Sector, Study Group 11–Report R92, Study Group 11 New Question 25/11: Signalling Requirements for the Support of Number Portability as Approved by TSAG, Feb. 1998, pp. 1–3.

Editor's Proposal for "ISUP Enhancements to Support NP CS1", Reinar Munch, ITU SG–11, pp. 1–16.

3G TS 23.066 V3.1.0, $3^{rd}$ Generation Partnership Project, Technical Specification Group Core Network, Digital Cellular Telecommunications System (Phase 2+); Support of Mobile Number Portability (MNP), Technical Realisation, Stage 2, (3G TS 23.066 version 3.1.0), pp. 1–73, Oct. 1999.

M. Foster et al: "Number Portability in the GSTN: An Overview" 12 pages, Internet Draft, Mar. 2001, XP002192483.

P. Falstrom: "E.164 Number and DNS" 4 pages, Internet Draft, Sep. 2000, XP002192484.

* cited by examiner

METHOD AND APPARATUS TO CARRY OUT RESOLUTION OF ENTITY IDENTIFIER IN CIRCUIT-SWITCHED NETWORKS BY USING A DOMAIN NAME SYSTEM

FIELD OF THE INVENTION

The present invention relates to providing Internet-based, conversational types of applications, e.g., a voice-over-IP application, and multimedia types of applications, e.g., streaming and multimedia message services, without the user having to know specific Internet addresses of remote devices or other entities with which a user may want to communicate using these types of applications.

BACKGROUND AND SUMMARY OF THE INVENTION

The present invention draws upon two different areas of communication: data packet-based communication employing Internet addresses and circuit-based communication where telephone (or other identifier) number portability has evolved to enable a subscriber to "port" a subscriber telephone number or other communication identifier geographically and/or between service providers. Packet-based communications are addressed first.

When computers attached to a network communicate, Internet protocol (IP) addresses are used to identify those computers and typically correspond to 32 bit integers for IP version 4 or 128 bit integers IP version 6. Although such IP addresses provide a convenient, compact representation for specifying the source and destination for packets sent across an Internet, human users prefer to assign computers pronounceable, easily remembered names. As a result, the domain naming system (DNS) was developed to provide a scheme for assigning meaningful, high level names to a large set of computers, and to provide a mechanism that maps between high level computer names and IP addresses.

In general, the domain naming system can be viewed as a distributed, shared database of domain names and corresponding IP addresses. Domain servers, more commonly called DNS servers, maintain these databases. An example of a common DNS server is a UNIX-type machine running a version of Berkeley Internet Naming Software (BIND). A domain name may consist of a sequence of subnames separated by a delimiter character—the period. Individual sections of the name might represent sites or groups, but the domain naming system simply refers to each section of a name as a label. An example of such a domain name is an Internet address. The label after the period is the site name authorized by a central authority. The label(s) before the period is(are) the part of the name controlled by the specific site. Here, the top level Internet domain corresponding to the site is the country code "se" for Sweden, and for the e-mail address, it is the top level domain "com".

Domain servers are conceptually arranged in a tree structure that corresponds to a naming hierarchy. The root of the tree is a server that recognizes the top level domains (or tiers) and knows which server resolves each domain. Given a name to resolve, the root can choose the correct server for that name. At the next level or tier, a set of name servers each provide resolution answers for one top level domain, e.g., se. A server at this domain knows which servers can resolve each of the subdomains under its domain. At the third level of the tree, name servers provide answers for subdomains, e.g., ericsson under se. The conceptual tree continues with one server at each level for which a subdomain has been defined.

Links in the conceptual tree, however, do not indicate physical network connections. Instead, they point to other name servers. Conceptually, domain name resolution proceeds top down, starting with the "root" name server and proceeding to servers located at the branches or leaves of the tree. There are two ways to use the domain naming system: (1) by contacting name servers one at a time, or (2) asking a name server system to perform the complete translation. In either case, client software forms a domain name query that contains the name to be resolved, a declaration of the class of the name, the type of answer desired, and a code that specifies whether the name server should translate the name completely. It sends the query to a DNS server for resolution.

When a DNS server receives a query, it checks to see if the name lies in the subdomain for which it is an authority. If so, it translates the name to an address according to its database and appends an answer to the query before sending it back to the client. If the DNS server cannot resolve the name completely, it checks to see what type of interaction the client specified. If the client requested complete translation, (i.e., recursive resolution), the server contacts a DNS server that can resolve the name and returns the answer to the client. If the client requested non-recursive resolution, (i.e., iterative resolution), the name server cannot supply an answer. Instead, it generates a reply that specifies the name server the client should contact next to resolve the name.

The dynamic host configuration protocol (DHCP) provides automated procedures by which a master node can assign an IP address to a server in the Internet, e.g., a DNS server. In general, IP addresses can be allocated to an entity either statically, i.e., a fixed IP address, or dynamically, i.e., only for as long as the entity is actively connected to the Internet. User devices, like a computer entity or a mobile device in a packet radio system (e.g., GPRS) system, are normally assigned temporary Internet addresses. Although conceptually fairly simple, in practice, the resolution of IP addresses using DNS can be complex and time consuming.

The Internet and the domain naming system are designed to carry packet traffic for enabling computers to communicate. Other types of networks are designed to carry circuit-switched traffic. An example of a circuit-switched network is a legacy network, which employs control signaling using the well-established Signaling System No. 7 (SS-7) as defined by various standards bodies. The routing of a telephone call through a legacy network employs a structured telephone numbering plan. Such structured rules are defined by the International Telecommunication Union (ITU) in the E-series Recommendation E.164. E.164 numbering is applicable in all domains of telecommunications systems including wireline and wireless systems. Each physical node, referred to as a local exchange, is allocated one or more unique exchange number groups. The telephone number of a subscriber typically includes both an exchange number group (typically allocated in ten thousand number blocks) for the exchange to which a subscriber is connected, and a number in that group which is specific to the subscriber.

For example, a subscriber having a telephone number 881-1657 is connected to a local exchange having an exchange number group 881, within that group, the subscriber has a subscriber number of 1657. Thus, the telephone number is geographical in the sense that there is a defined relationship between the telephone number and a geographical area served by the exchange to which the subscriber is connected. There are also non-geographical telephone numbers where no geographical relationship exists. For example, toll free numbers, virtual private network numbers, and universal access numbers are typically serviced by intelligent networks (IN). IN services are controlled and executed by a service control point (SCP) using data stored in a service data function (SDF).

When a subscriber physically relocates or changes service providers, it is desirable for the subscriber not to have to change his telephone number. Accordingly, number portability services permit a subscriber to "port" or transfer his telephone number to wherever the subscriber physically relocates or to a different service provider. Similarly, a mobile subscriber E.164 identification number, such as the mobile subscriber integrated services digital network number (MSISDN), is used to identify the mobile subscriber, the subscriber's subscription, and the subscriber's current location. When a mobile subscriber changes service providers, a mobile subscriber number portability database is updated to reflect the change. Commonly-assigned U.S. Pat. No. 6,064,887 describes an example of mobile subscriber number portability in a telecommunications network that permits a mobile subscriber to retain its same MSISDN when changing service providers.

Recently, there have been discussions in the Internet Engineering Task Force (IETF) and other forums of the possibility of permitting a user to enter a telephony number, hereafter often referred to as an "E.164 number," into a computing device with the goal of treating that E.164 number as a DNS query for which a corresponding Internet address is supplied by the DNS. This particular type of DNS query is referred to as an ENUM query. A recent IETF request for comments (RFC) 2916 entitled, "E.164 Number and DNS," outlines the possible use of the domain naming system for the storage of E.164 telephony numbers. The DNS could then be used to identify available services connected to an E.164 number.

A problem with using the domain naming system to resolve E.164 telephone numbers into other corresponding addresses such as Internet addresses is that a routing node, such as a gateway MSC, who receives a call including a called party does not know whether the called party's E.164 telephone number is a ported number. If the E.164 number has been transferred to another network operator, the routing node does not have enough information to properly route the call. Another limitation is that an MSC (or GMSC) does not "speak the same language" as the DNS system.

The present invention overcomes these problems by providing an efficient interface and service exchange between a circuit-switched communications network and a domain naming system in a packet-switched communications network. A node in the circuit-switched communications network receives from a first entity a request for a first service involving a second entity associated with a second entity identifier. A message is sent from the circuit-switched network node to a DNS server in the packet-switched network requesting a second service related to the second entity identifier. The result of the second service from the DNS server is used in providing the first service. For example, the first service may be an electronic communication between the first and second entities, and the second service may be resolution of the second entity identifier. Such resolution may include resolution of a number, name, or address associated with the second entity. Other example second services include a prepayment service where the DNS server is used to retrieve prepaid charging information for the first or second entity. Alternatively, the DNS server may be used to access other types of servers (such as a weather service server or a news server) associated with a particular entity identifier.

A preferred, non-limiting, example embodiment of the invention takes into account number portability. A circuit-switched routing node in the circuit-switched network sends a routing request message with the second entity identifier to a number portability database (NPDB) node. The message includes an indication that DNS resolution is needed for the second entity identifier. The NPDB node requests resolution of the second entity identifier from a DNS server, which returns a resolution result that indicates whether the second entity identifier has been transferred ("ported") between network operators. If there has been no transfer, i.e., no number porting, the electronic communication is routed in a fashion that does not take into account number portability. On the other hand, if the second entity identifier has been ported, the DNS server provides the routing node in the circuit-switched communications network with a resolution result that identifies the home network of the second entity. The resolution provided by the DNS service may include resolution of a number, name, or address associated with the second entity.

In an example application where the circuit-switched network is a mobile network, and the packet-switched network is the Internet, a Gateway Mobile Switching Center (GMSC) in the mobile network receives a call setup message intended for a called entity that includes a called entity telephone number. The GMSC queries a number portability database (NPDB) node in the circuit-switched network using the called entity telephone number indicating that DNS resolution is needed. The number portability database node generates an ENUM query to the DNS server using the called entity telephone number. The DNS server performs DNS resolution and returns an NAPTR record with a Universal Resource Locator (URL) corresponding to the called entity telephone number.

The contents of the NAPTR record vary depending on whether the called entity telephone number has been ported between network operators. If the number is ported, the DNS resolution provides a prefix for the called entity telephone number. Accordingly, a call setup message is sent to a Home Location Register (HLR) database located in the called entity's home network. The HLR requests a routing number from a Visiting Location Register (VLR) database currently serving the called party. Once that routing number is obtained, it is provided to the GMSC. The GMSC then has sufficient information to route the call to the called entity. Example signaling implementations are described in more detail below using SS7 signaling protocols to different types of existing number portability databases.

Another aspect of the present invention addresses a problem that is particular to mobile communications networks. In mobile communications networks, subscriber services and other information pertaining to a subscriber subscription are stored in the home operator network database, i.e., home location register (HLR), based on subscriber International Mobile Subscriber Identity (IMSI) numbers. On the other hand, routing information employed in call setup procedures employ Mobile Subscriber Integrated Services Digital Network (MSISDN) numbers. Thus, there is a mobile identifier incompatibility when a node like the GMSC must route a call based upon the called entity's MSISDN but needs certain information regarding that called entity stored in the HLR database based on the called entity's IMSI.

The present invention solves this problem by using the Domain Naming System (DNS) to administer a relationship between a mobile subscriber's MSISDN and IMSI. Thus, when a call setup message is received with the called entity's MSISDN, an ENUM message is sent to a DNS server requesting resolution of the called entity's MSISDN. The DNS server uses the MSISDN in the ENUM query to obtain a corresponding NAPTR record that includes the called entity's IMSI. The returned IMSI is used to route the call. A similar relationship can be administered in the DNS between the called entity's MSISDN (or any other identifier) and a Mobile Global Title (MGT) (or any other identifier) associated with the called entity.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not to scale, emphasis instead being placed upon illustrating the principles of the invention.

DETAILED DESCRIPTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In some instances, detailed descriptions of well-known methods, protocols, software and hardware platforms, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuitry, using software functioning in conjunction with a suitably programmed digital microprocessor or general purpose computer, using an Application Specific Integrated Circuit (ASIC), and/or using one or more Digital Signal Processors (DSPs).

Figure 1:
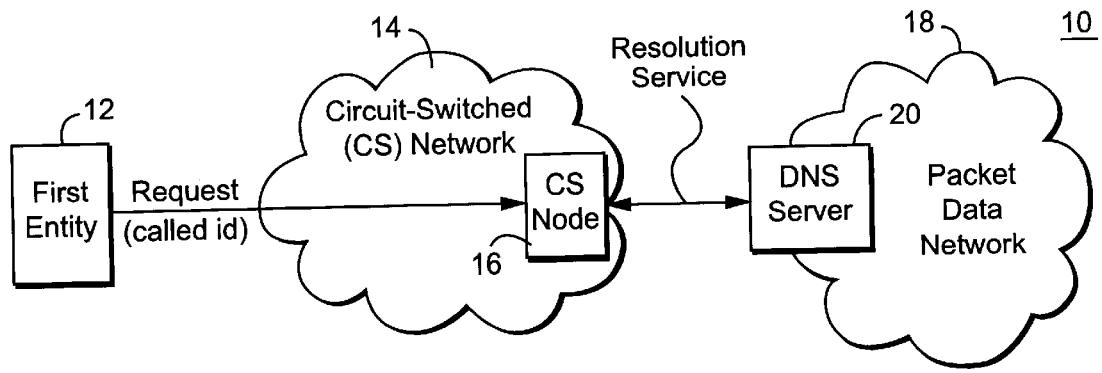
FIG. 1 illustrates a communications system in which the present invention is employed.

FIG. 1 illustrates a general communications system 10 illustrating an example application of the invention. A first entity 12 sends a request for communication with a called entity to a circuit-switched (CS) network 14 which is provided to a circuit-switched network node 16 that provides routing services. Included in that request is an identifier that is associated with the called entity. The term "entity" is used in a most general sense and includes (but is not limited to) any user device, any service application, or any processing unit whether user-specific, network-specific, or both. The called entity identifier includes any type of identifier. In some situations, the called entity identifier should be resolved in order to permit communication between the first entity 12 and the called entity.

To facilitate this resolution process, the circuit-switched network node 16 requests a resolution service from a domain naming system (DNS) server 20 which is coupled to a packet data network 18. As described above, the domain naming system is part of the packet data network 18, e.g., the Internet. The DNS server initiates the resolution service using the DNS using the called identifier and provides the resolution result to the circuit-switched network node 16 for further processing of the first entity's request. The circuit-switched core network node 16 may perform some service itself based on the resolution result or it may provide the resolution result to another node in the circuit-switched network 14 for further processing of the first entity's request.

Figure 2:
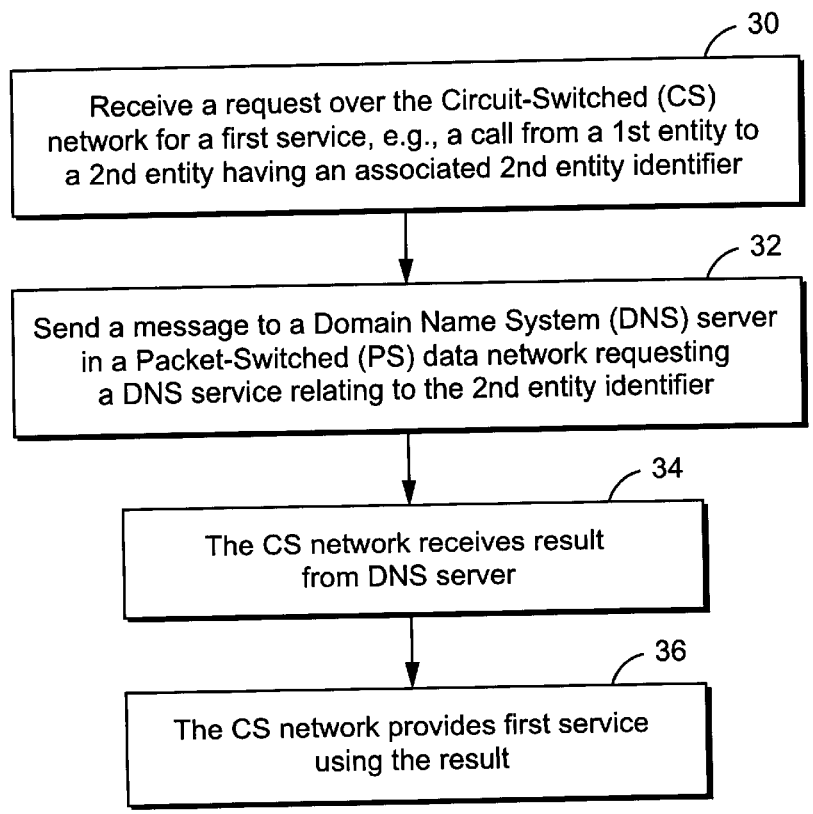
FIG. 2 is a flowchart diagram illustrating one set of example procedures for implementing the present invention in the context of the communications system of FIG. 1.

The flowchart in FIG. 2 illustrates example procedures associated with one example implementation of the present invention in the communications system 10 shown in FIG. 1. A request is received over the circuit-switched network 14 for a first service, e.g., a call from a first entity 12 to a second called entity (not shown), which has an associated second entity identifier (block 30). A message is sent to a DNS server 20 in a packet-switched data network 18 requesting a DNS service relating to the second entity identifier (block 32). A result is received from the DNS server 20 by the circuit-switched network (block 34). The circuit-switched network provides the first service using the DNS result (block 36).

Figure 3:
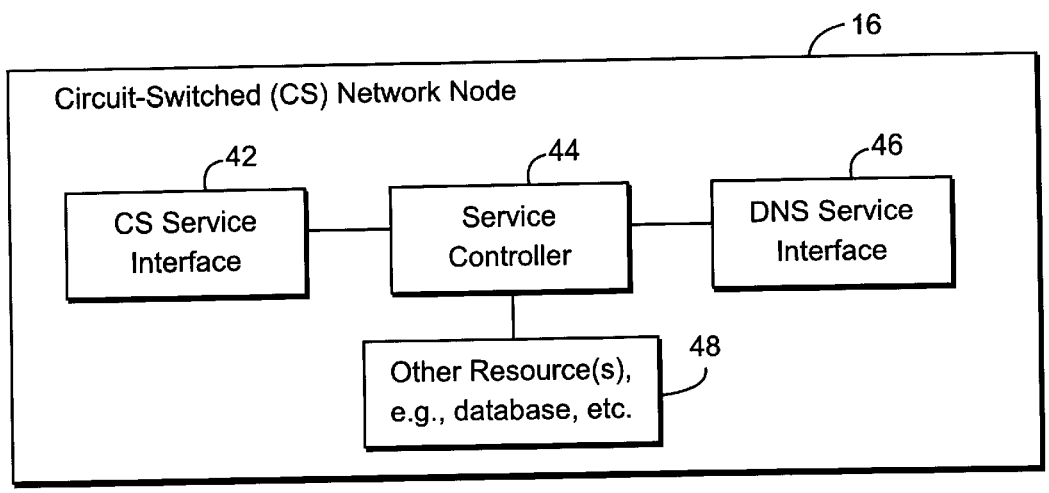
FIG. 3 is a simplified function block diagram of the circuit-switched network node shown in FIG. 1.

FIG. 3 illustrates in a simplified function block format the circuit-switched network node 16 shown in FIG. 1. The circuit-switched network node 16 includes a circuit-switched service interface 42 coupled to a service controller 34, which in turn, is coupled to a DNS service interface 46, and perhaps, to other resources such as a database 46. The functions of the blocks 42, 44, and 46 may preferably be performed using software code executed on a suitable microprocessor or other computing circuitry.

The circuit-switched service interface 42 receives requests for DNS resolution from one or more circuit-switched nodes, e.g., a circuit-switched routing node. This interface 42 employs standard control signaling protocols used in the circuit-switched network, e.g., Signaling System 7 (SS7) signaling. The service controller 44 analyzes the signaling messages, and detects the called entity identifier and any indication of whether DNS resolution is required for this called entity identifier. If so, the service controller 44 coordinates with the DNS service interface 46 so that the DNS service interface 46 generates an appropriate query using a packet-switched network signaling protocol recognized and used by the domain naming system. The DNS service interface 46 receives the DNS resolution result in PS network control signaling format and returns it to the service controller 44, which in turn, provides it to the CS service interface 44. The CS service interface 44 formats the resolution result into a circuit-switched network signaling protocol message, e.g., a CS routing message.

These functions of the circuit-switched network node 16 may be implemented in any one of a variety of nodes that exist in the circuit-switched network or in a new node may be added to the circuit-switched network. Of course, it is likely preferable in existing networks to simply add software code which implements these functions to an existing node to minimize expense and other disadvantages that might be associated with reconfiguring or adding nodes in or to a network.

The present invention provides a number of advantages. First, it permits circuit-switched network entities to obtain access and receive services provided by a packet-based network, in this case, DNS services. Packet-based services offer flexibilities and options which might not be offered or otherwise practical in the circuit-switched network. Second, this access to IP network services can be achieved without major configuration or expense simply by implementing the present invention using software code in an existing node in the circuit-switched network. Third, telecom carriers may take advantage of the DNS IP infrastructure to enhance number portability resolution as well as other services that employ number handling in circuit-switched domains. For example, existing circuit-switched domain numbering services, like a pre-paid resolution based on a called E.164 number service and a local numbering plan translation into a specific circuit-switched service, (e.g., connection to emergency center, connection to information centers, etc.), may also benefit from number resolution being provided through the DNS.

A more detailed example implementing the present invention in a non-limiting way is now described below in the context where the circuit-switched network is a mobile/cellular network and the packet-switched network is the Internet. Reference is made to the flowchart diagram illustrating example procedures in FIG. 4. A circuit-switched routing node in a cellular network receives from a mobile subscriber a call setup message to a called entity including a telephone number associated with the called entity (block 50). The circuit-switched routing node sends a routing request message to an existing number portability (NPDB) node in the circuit-switched network which includes the called entity telephone number and a request for DNS resolution (block 51). Thus, in this example, the number portability database in the circuit-switched network includes software-based functionality that provides access to the DNS resolution services offered by the Internet. Of course, other nodes in the mobile network could perform these functions as well.

The number portability database, as explained above, interprets circuit-switched signaling protocol messages, such as SS7 messages, used in the cellular network and extracts from them information such as the called entity telephone number and an indication of a request for DNS resolution. This information is used to format a query to a DNS server requesting DNS resolution of the telephone number. In particular, in this example, the number portability database node sends an ENUM query to a DNS server (block 53). In this non-limiting example, traditional mobile and fixed telephone numbers referred to as E.164 numbers are sent in the ENUM query. However, other identifier schemes may be used to identify a user subscription location, a user's equipment, and a user's service application in both public and private environments. In other words, the present invention is not limited to a particular identifier or naming scheme.

ENUM queries are explained in the Internet Engineering Task Force (IETF) Request for Comments (RFC) 2916 which describes the ENUM procedures for sending E.164 numbers in the DNS infrastructure. ENUM can be viewed as a format for a DNS query carrying identifier information, like E.164 numbers. A specific example of how an original E.164 telephone number is converted into an ENUM message format is provided in commonly-assigned, copending application Ser. No. 09/899,551, entitled "Method and Apparatus for Resolving an Entity Identifier into an Internet Address Using a Domain Name System (DNS) Server and an Entity Identifier Portability Database," filed on Jul. 6, 2001, the disclosure of which is incorporated herein by reference.

According to RFC 2916, the domain naming system uses ENUM query to retrieve a Naming Authority PoinTeR (NAPTR) record associated with the E.164 number of the called entity. The DNS response to the ENUM query contains one or more NAPTR records corresponding to the E.164 number, and each NAPTR record contains one or more Uniform Resource Identifiers (URIs) corresponding to the entity. From a URI, a service and/or an address corresponding to the called entity identifier may be derived. Reference is again made to the above-identified application for specific examples.

Accordingly, the DNS server returns a NAPTR record for the called entity telephone number (block 54), and the number portability database node sends the resolution result to the circuit-switched routing node (block 55). The circuit-switched routing node routes the mobile subscriber call using the DNS resolution result (block 56).

Figure 4:
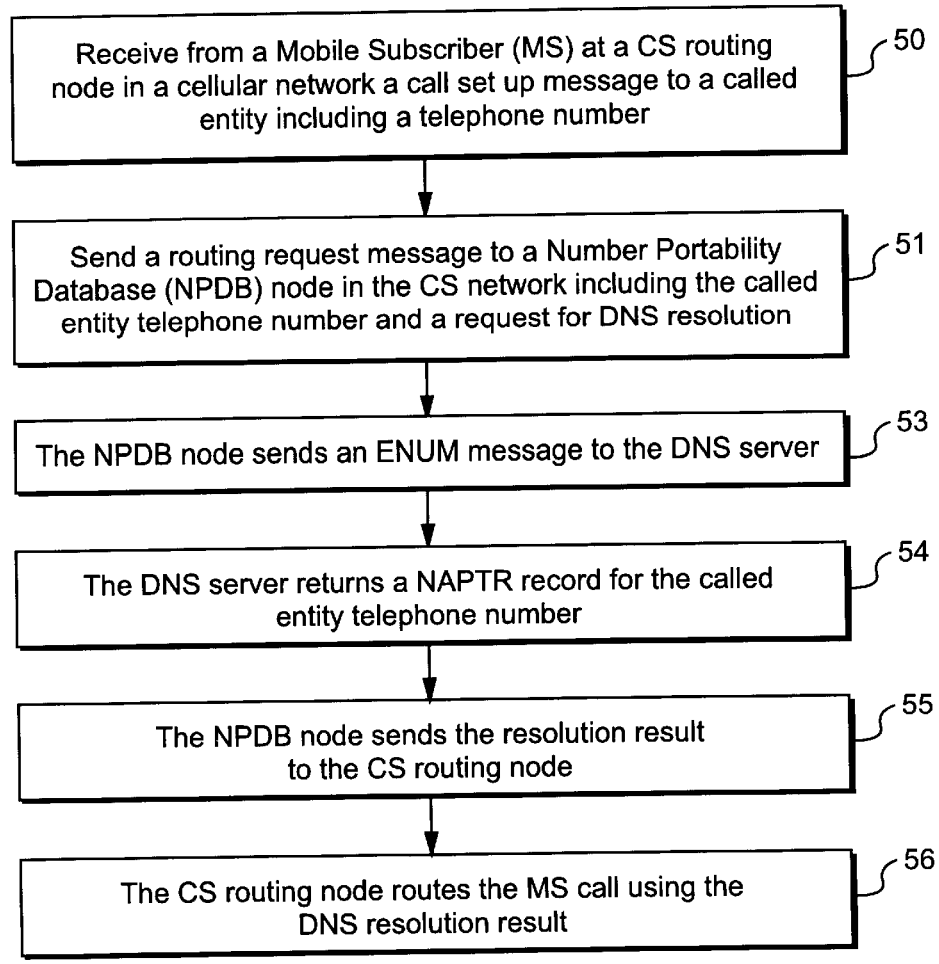
FIG. 4 is a flowchart diagram illustrating one set of procedures for an example application of the present invention to a mobile communications context where a number portability database node is used to coordinate DNS resolution.
Figure 5:
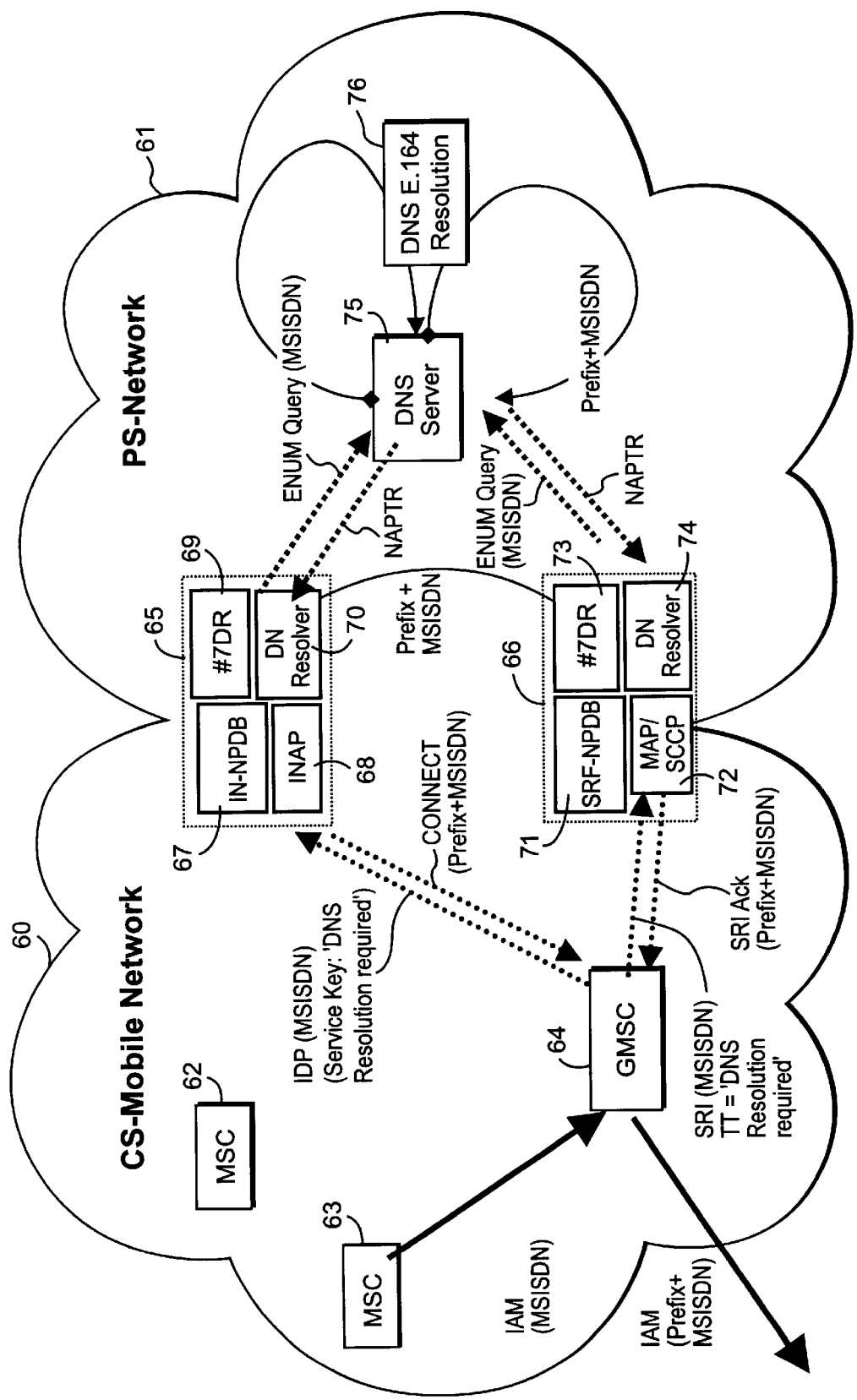
FIG. 5 is a diagram illustrating a mobile network and the Internet in which two examples are shown where the present invention may be implemented in a number portability context.

Reference is made to FIG. 5 which shows a communications system in which the procedures outlined in FIG. 4 may be applied. A circuit-switched mobile network 60 is shown including two mobile switching centers (MSCs) 62 and 63, one of which is coupled to a gateway MSC (GMSC) 64. The circuit-switched mobile network 60 also includes two number portability databases, indicated generally at 65 and 66. The Intelligent Network (IN) type of NPDB 65 at the top of the figure employs an Intelligent Network Application Part (INAP) protocol, and the Signaling Relay Function (SRF) type of NPDB 66 at the bottom of the figure uses a Mobile Application Part (MAP) protocol. Both of these protocols employ SS7 signaling. The packet-switched network 61 includes, among other things, a DNS server 75 coupled to a DNS shown symbolically at 76.

A call to a called entity initiated by a mobile phone in the mobile network 60 is forwarded to MSC 63 which forwards the call in an SS7 Initial Address Message (AM) that includes the called entity's MSISDN to the gateway MSC 64. Depending on which type of number portability database may be in the mobile network 61, the gateway MSC 64 routing node formulates an SS7 Send Routing Information (SRI) request message that provides the called entity's MSISDN as well as indication that DNS resolution is required. If the number portability database is Intelligent Network (IN)-based, then an Initial Detection Point (IDP) message including the MSISDN number is forwarded to the IN-number portability database 67 along with a service key with a "DNS resolution required indication." The IN-NPDB 67 communicates with the GMSC using signaling information based on the INAP protocol.

The software entity in the NPDB 65 referred to as #7DR (SS7 Domain name Resolver) 69 analyzes the IDP message and detects the MSISDN and the fact that a DNS resolution is required via the service key. The #7DR 69 provides the MSISDN to a Domain Name (DN) resolver 70 which formulates an ENUM query using the MSISDN number and sends it to the domain naming system 75. E.164 resolution is performed in the DNS 76, and the resolution result is returned to the DN resolver 70. The DN resolver 70 forwards the resolution result to the SCP 67 via the #7DR 69, which sends an SS7 CONNECT message back to the GMSC 64. The CONNECT message includes the MSISDN number and a corresponding prefix if the MSISDN number has been ported. The prefix indicates the location of the called telephone number's current home operator network. The gateway MSC 64 now has sufficient information to route the call because the prefix provides routing information for the home network of the called entity. Accordingly, the gateway MSC 64 sends an SS7 Initial Address Message (IAM) that includes both the prefix and the MSISDN number for the called entity.

Alternatively, the gateway MSC 64 may communicate with a Signaling Relay Function (SRF) type of number portability database node 71 that can relay or answer back an incoming SS7 Send Routing Information (SRI) MAP message. The SRF number portability database node 71 communicates with the GMSC 64 using SS7 signaling. The GMSC 64 sends a Send Routing Information (SRI) message that includes (1) the called entity MSISDN number and (2) a Translation-Type (TT) field that indicates a DNS resolution is required. The SS7 protocol conforms with the mobile application part (MAP)/Signaling Connection Control Part (SCCP) 72. The SRF-NPDB 71 may relay at the SCCP level the incoming SRI message to a home location register (HLR) type of database (as is described in more detail below) or to answer the GMSC with an SRI Acknowledgement.

The #7DR entity 73 analyzes the SRI message and detects the DNS resolution required in the TT field. Accordingly, it forwards the MSISDN number to the DN resolver 74 which generates an ENUM query with the MSISDN and forwards it to the DNS server 75 as described above. The DNS resolution result, i.e., a NAPTR record, is provided in an SRI acknowledgement message that includes both the called entity identifier's home network prefix (assuming the number is ported) and the MSISDN number to the GMSC 64 for routing.

Figure 6:
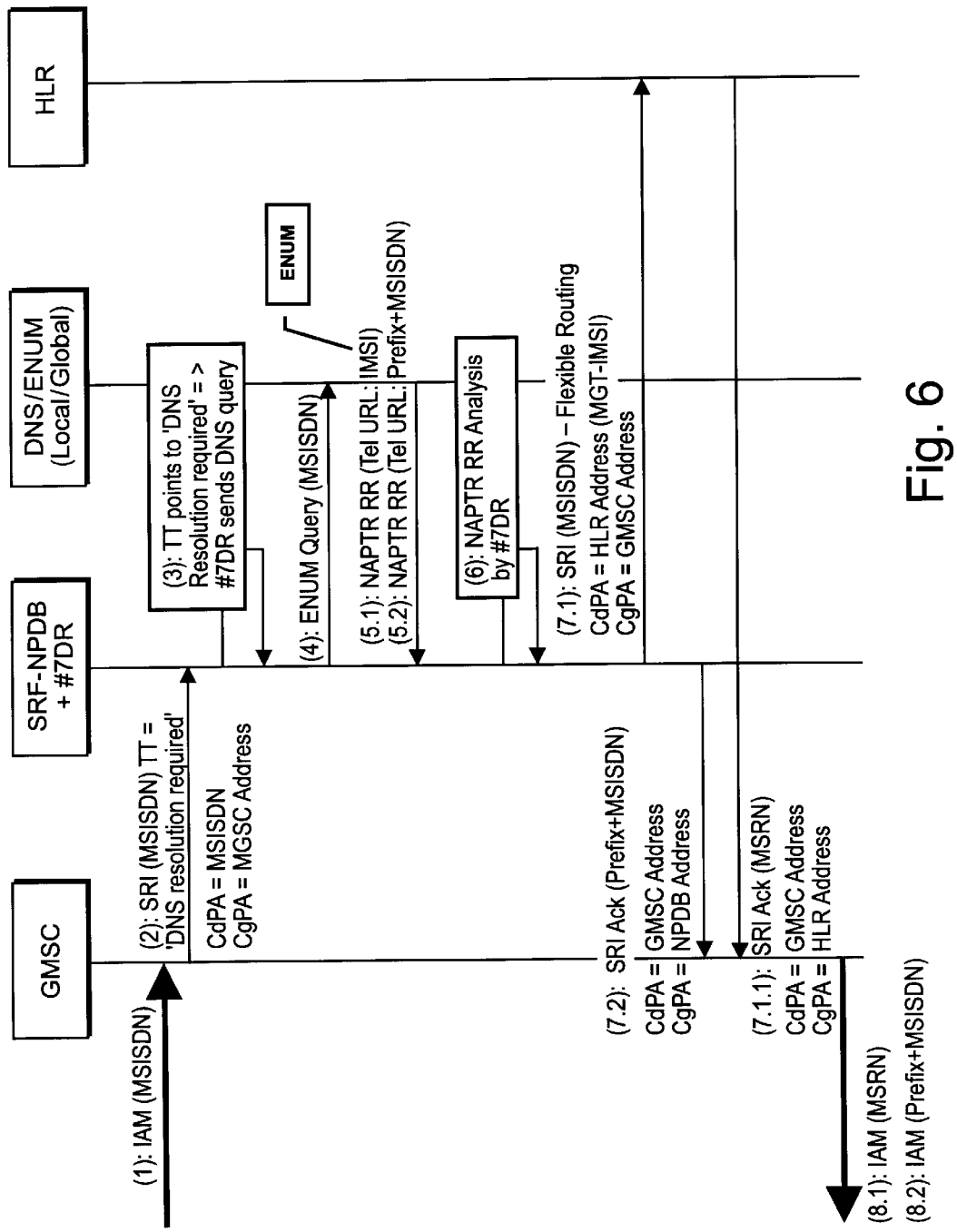
FIG. 6 is a signaling diagram relating to the present invention illustrating example signals using one circuit-switched network signaling protocol.

FIG. 6 illustrates a signaling diagram for the signaling scenario where the number portability database a Signaling Relay Function (SRF) type of NPBD. Signal (1) is an Initial Address Message (IAM) that includes the called entity MSISDN. The IAM is routed to the gateway MSC of the number range in the home network for the calling entity. When the GMSC receives the IAM message (2), it sends an SRI message to the number portability database node with a translation-type field indicating that a DNS resolution is required for this number. The #7DR entity analyzes that translation-type field and directs the DNS resolver to formulate an ENUM query for the called MSISDN number (4). In response to the ENUM query, the DNS server ultimately provides an associated NAPIR record tied to this number which contains either a URL with IMSI information (5.1) or a URL with a prefix plus MSISDN information for the called entity (5.2). The NAPTR record content is analyzed by the #7DR entity to determine whether the called entity's number is ported (6). As described above, "porting" describes the transfer of a number between network operators. Number portability permits a mobile subscriber to change his subscription network while retaining the original MSISDN.

In the message 5.1, the NAPTR record includes a telephone URL that does not include a prefix for the MSISDN, indicating that the called entity identifier telephone number is not ported. However, in another advantageous aspect of the present invention, the NAPTR record telephone URL provides the IMSI for the called entity which can be used to service the call. Namely, HLR-type databases in mobile radio networks traditionally store subscriber information under the subscriber's IMSI. On the other hand, routing is performed based on the mobile subscriber's MSISDN number. This aspect of the present invention permits the DNS to administer the relationship between a subscriber's IMSI and MSISDN to facilitate routing of non-ported numbers. In other words, the NAPTR record provides the SRF-number portability database 71 the called party's IMSI so that the SS7 Send Routing Information message can be rerouted, or "relayed" by the SRF-NPDB 71 to the called party's HLR database with the subscriber's IMSI.

With that IMSI, the HLR is able to look up appropriate information and then request a routing number for the called entity from the MSC/Visited Location Register (VLR) where the called subscriber is currently registered. The MSC/VLR returns the Mobile Station Routing Number (MSRN) back to the HLR. The HLR sends a Send Routing Information (SRI) ACKnowledgment message with the mobile subscriber routing number (MSRN) to the GMSC. This permits the GMSC to generate an initial address message using the MSRN to properly route the call to the visited network.

Alternatively, if the NAPTR record returns a telephone URL with a home network prefix plus the MSISDN (5.2), the NAPIR record analysis by the #7DR detects that the MSISDN is ported. The SRF-NPDB sends an SRI ACKnowledgment message to the GMSC reporting the prefix which corresponds to a routing number of the called subscriber's home or subscription network along with the MSISDN. As a result, the gateway MSC then formulates the Initial Address Message using the home/subscription network prefix and the MSISDN for routing to the home/subscription network.

Figure 7:
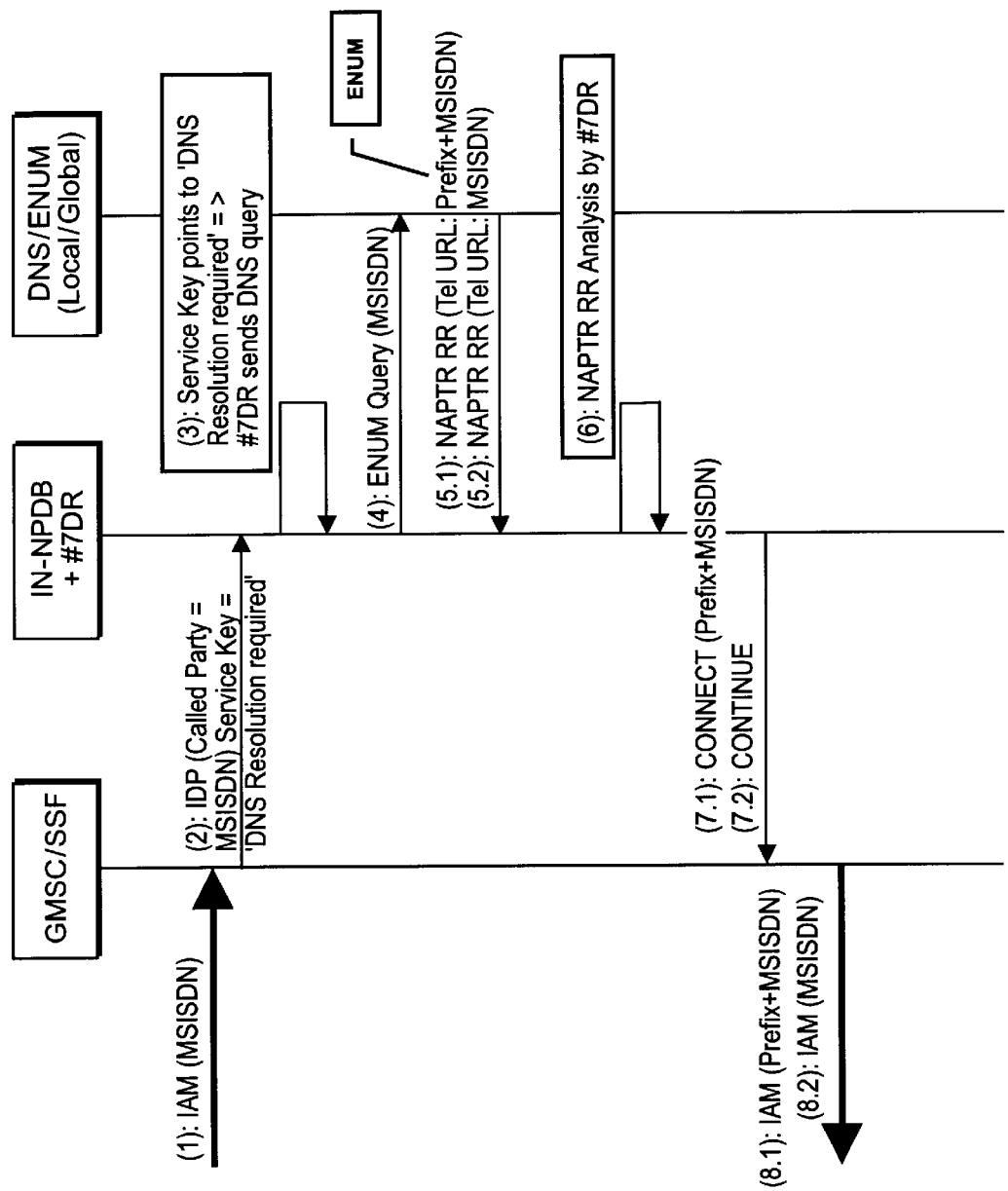
FIG. 7 is a signaling diagram illustrating the present invention using another signaling protocol.

A similar type signaling diagram is shown for an intelligent network type number portability database in FIG. 7. The call is routed to the gateway MSC/Switching Service Function (SSF) of the number range in the subscription network of the calling mobile subscriber (1). When the GMSC/SSF receives the Initial Address Message with the called entity MSISDN, it sends an IN database query to the IN number portability database with a special Service Key indicating that a DNS resolution is required for this number (2). The #7DR entity at that node analyzes the service key (3) and causes the DN resolver at that node to formulate an appropriate ENUM query to a DNS server (4). In response to the ENUM query, one or more associated NAPTR records for this MSISDN are returned. In (5.1), the NAPTR record contains a URL with the home/subscription network prefix plus the MSISDN number indicating that the number has been ported.

The content of the NAPTR record is analyzed by #7DR 69 at (6), and an Intelligent Network Application Part (INAP) protocol CONNECT message is sent to the GMSC/SSF along with the home/subscription network prefix and the MSISDN number (7.1). This information permits the GMSC/SSF to formulate an appropriate IAM routing message with the prefix and the MSISDN (8.1). Alternatively, if the NAPTR record includes only the URL for the MSISDN (5.2), the #7DR 69 determines that the called subscriber number has not been ported (6), and sends an INAP CONTINUE message back to the GMSC/SSF (7.2) which formulates an IAM routing message with just the MSISDN number (8.2).

Figure 8:
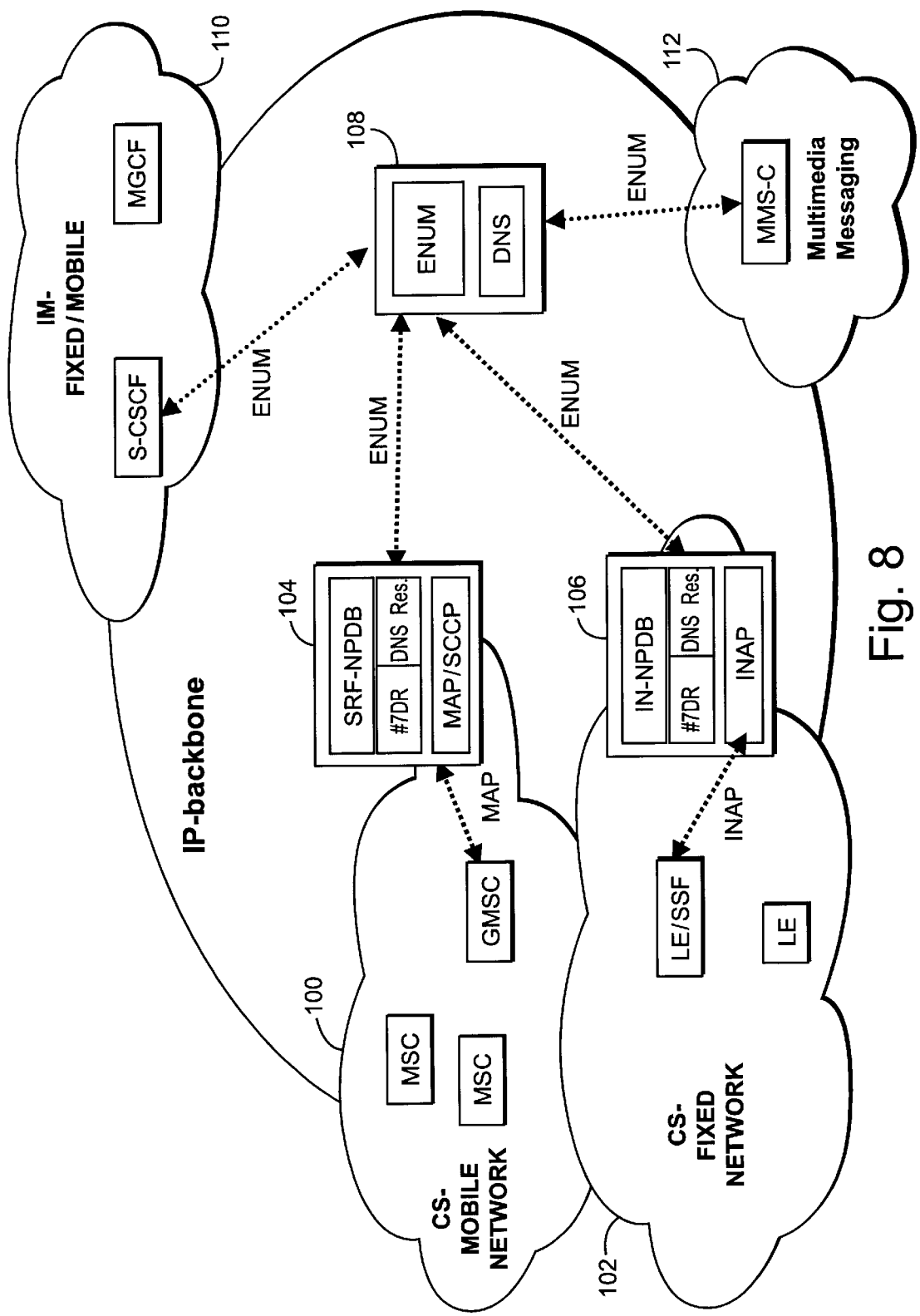
FIG. 8 illustrates another communications network in which the present invention may be implemented in a number portability database node and in other nodes for other networks.

The present invention is not limited to any of the particular implementation details or specific applications described above. Indeed, different types of networks may employ different types of nodes to provide access to domain naming system resolution services. Referring to several examples shown in FIG. 8, a circuit-switched mobile network 100 and the circuit-switched fixed network 102 may each employ a corresponding number portability database 104 and 106, respectively, to orchestrate the ENUM query and NAPTR record analysis. An IP Multimedia (IM) system 110 for either a fixed or mobile network may employ a Serving-Call Service Control Function (S-CSCF) entity for the mobile network and a Management Gateway Control Function (MGCF) entity in the fixed IM network to perform the ENUM query and NAPTR record analysis. Furthermore, a Multimedia Messaging System (MMS) network 112 may employ an multimedia message service center (MMS-C) to perform these functions as well.

Using the present invention, number portability lookup information may be queried under the same approach irrespective of interrogating system, and hence, irrespective of call control technology. The administration of number portability information is performed using this common approach where the DNS services all inquiring entities. The invention may be used in any E.164 numbering (or other numbering) related procedures where an E.164 resolution process is involved.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, the DNS/ENUM process is relevant for server-to-server communication without any on-line user. Thus, although the present invention is described in relation to a preferred example embodiments, it is to be understood that this disclosure is only illustrative and exemplary of the present invention. The scope of the invention is defined by the appended claims.

What is claimed:

1. A method for a circuit-switched communications network to provide communication services to a subscriber, comprising:

receiving from a first entity a request over the circuit-switched communications network for a first service involving a second entity associated with a second entity identifier;

a circuit-switched routing node in the circuit-switched communications network sending a routing request to a number portability database in the circuit-switched communications network with the second entity identifier;

the number portability database sending a message to a domain name system (DNS) server in a packet-switched network requesting a second service related to the second entity identifier;

receiving a result of the second service from the DNS server; and providing the first service using the result.

2. The method in claim 1, wherein the first service is an electronic communication between first and second entities, and the second service is a resolution of the second entity identifier.

3. The method in claim 1, wherein the routing request further indicates that DNS resolution is needed for the second entity identifier, and wherein the DNS server returns a resolution result.

4. The method in claim 3, wherein the result of the DNS resolution indicates whether the second entity identifier has been transferred between network operators.

5. The method in claim 4, wherein if the second entity identifier has not been transferred between network operators, the method further comprises:

processing the electronic communication in a fashion that does not take into account number portability, and wherein if the second entity identifier has been transferred between network operators, the method further comprises:

processing the electronic communication in a different fashion that takes into account number portability.

6. The method in claim 5, wherein the different fashion processing includes providing the routing node in the circuit-switched communications network with a routing number that identifies a home network of the second entity.

7. The method in claim 1, wherein the first service is an electronic communication between first and second entities, and the second service is a resolution of a number, name, or address associated with the second entity.

8. A method for providing call services to a mobile subscriber, comprising:

receiving from the mobile subscriber at a circuit-switched node in a circuit-switched cellular network a call setup message to a called entity including a called entity telephone number;

the circuit-switched node querying a number portability database in the circuit-switched cellular network using the called entity telephone number and an indication that domain name system (DNS) resolution is needed for the called entity telephone number;

the number portability database sending a message to a DNS server in a packet-switched network requesting a resolution of the called entity telephone number;

receiving a resolution result from the DNS server for the called entity telephone number; and routing the mobile subscriber call using the resolution result.

9. The method in claim 8, wherein the number portability database generates an ENUM query to the DNS server including the called entity telephone number, and the DNS server returns an NAPTR record including a universal resource locator corresponding to the called entity telephone number.

10. The method in claim 9, wherein the NAPTR record varies depending on whether the called entity telephone number has been transferred between network operators.

11. The method in claim 10, wherein if the called entity telephone number has not been transferred between network operators, the method further comprises:

processing the call setup message in a first fashion that does not take into account number portability, and wherein if the called entity telephone number has been transferred between network operators, the method further comprises:

processing the call setup message in a second fashion that takes into account number portability.

12. The method in claim 11, wherein the second fashion includes informing the circuit-switched node of a home network of the called party.

13. The method in claim 12, wherein the first fashion includes routing the call setup message to a home location register (HLR) for the called entity, the HLR requests a routing number from a visiting location register (VLR)

currently serving the called party, and provides the routing number returned by the VLR to the circuit-switched node.

14. The method in claim 8, wherein entities in the circuit-switched network employ an SS7 signaling protocol.

15. The method in claim 14, wherein the circuit-switched node is gateway mobile switching center (GMSC) which queries the number portability database using a mobile application part (MAP) protocol and a specific translation type (TT) requesting DNS resolution.

16. The method in claim 14, wherein the circuit-switched node is gateway mobile switching center (GMSC) which queries the number portability database using intelligent network application part (INAP) protocol and a specific service by requesting DNS resolution.

17. A method for providing call services to a mobile subscriber, comprising:
receiving from the mobile subscriber at a circuit-switched node in a cellular network a call setup message to a called entity including a called entity telephone number;
sending a message to a domain name system (DNS) server in a packet-switched network requesting a resolution of the called entity telephone number;
receiving a resolution result from the DNS server for the called entity telephone number; and
routing the mobile subscriber call using the resolution result,
wherein the called entity has a corresponding Mobile Subscriber Integrated Services Digital network Number (MSISDN) and an International Mobile Subscriber Identity (IMSI), the method further comprising:
administering in the DNS a relationship between the mobile subscriber's MSISDN and IMSI.

18. The method in claim 17, wherein the called entity has a corresponding Mobile Subscriber Integrated Services Digital network Number (MSISDN) and an International Mobile Subscriber Identity (IMSI), further comprising:
changing the MSISDN for the called entity to the IMSI for the called entity, and
using the called entity IMSI to route the call to the called entity.

19. A method for providing a call service where a called entity has a corresponding Mobile Subscriber Integrated Services Digital network Number (MSISDN) and an International Mobile Subscriber Identity (IMSI), comprising:
administering in a domain naming system (DNS) a relationship between the called entity's MSISDN and IMSI.

20. The method in claim 19, further comprising:
receiving a call setup message to the called entity including the called entity's MSISDN;
sending a message to a DNS server requesting a resolution of the called entity's MSISDN;
receiving from the DNS server the IMSI for the called entity telephone number entity's MSISDN; and
routing the call using the IMSI.

21. The method in claim 20, further comprising:
administering in the DNS a relationship between the called entity's MSISDN and a mobile global title (MGT) associated with the called entity.

22. The method in claim 21, further comprising:
receiving a call setup message to the called entity including the called entity's MSISDN;
sending a message to a domain name system (DNS) server requesting a resolution of the called entity MSISDN;
receiving from the DNS server the MGT for the called entity telephone number; and
routing the call using the MGT.

23. A number portability node in a circuit-switched communications network which provides a number portability service, comprising:
a circuit-switched service interface for receiving a request from a first entity in the circuit-switched communications network involving a second entity associated with a second entity identifier;
a controller for analyzing the request and determining that the second entity identifier should be processed in a domain name system (DNS); and
a DNS service interface for generating and sending a message to a DNS server in a packet-switched network requesting DNS processing of the second entity identifier,
wherein the controller is configured to receive a DNS response via the DNS service interface and provide the DNS response to the first entity.

24. The node in claim 23, wherein the DNS processing includes a resolution of the second entity identifier.

25. The node in claim 23, wherein the DNS response indicates whether the second entity identifier has been transferred between network operators.

26. The node in claim 25, wherein if the second entity identifier has been transferred between network operators, the controller is configured to provide a routing node in the circuit-switched communications network with a routing number that identifies a home network of the second entity.

27. The node in claim 23, wherein the DNS processing includes a resolution of a number, name, or address of the second entity identifier.

28. A number portability node in a circuit-switched communications network comprising:
a number portability database; and
electronic processing circuitry coupled to the number portability database and configured to perform the following tasks:
receive from a circuit-switched routing node a request including a called entity telephone number associated with a call setup message to the called entity;
send a message to a domain name system (DNS) server in a packet-switched communications network requesting a resolution of the called entity telephone number;
receive a resolution result from the DNS server for the called entity telephone number; and
provide the resolution result to the routing node for use in routing the call.

29. The number portability node in claim 28, wherein the request is a number portability database query indicating that DNS resolution is needed for the called entity telephone number.

30. The number portability node in claim 29, the electronic data processing circuitry is configured to generate an ENUM query to the DNS server including the called entity telephone number and to receive from the DNS server an NAPTR record including a universal resource locator corresponding to the called entity telephone number.

31. The number portability node in claim 29, wherein the contents of the NAPTR record varies depending on whether the called entity telephone number has been transferred between network operators.

32. The number portability node in claim 31, wherein if the called entity telephone number has been transferred between network operators, the electronic data processing circuitry is configured to process the call setup message to take into account number portability.

33. The number portability node in claim 32, wherein the electronic data processing circuitry is configured to inform the circuit-switched node of a home network identifier of the called party.

34. The number portability node in claim 33, wherein if the called entity telephone number has been transferred between network operators, the electronic data processing circuitry is configured to route the call setup message to a home location register (HLR) for the called entity so that the HLR may obtain a routing number from a visiting location register (VLR) currently serving the called party and provide the routing number to the circuit-switched node.

35. The number portability node in claim 28, wherein the circuit-switched node and the number portability node employ an SS7 signaling protocol.

36. The number portability node in claim 28, wherein the circuit-switched node is gateway mobile switching center (GMSC) which queries the number portability database using mobile application part (MAP) protocol and a specific translation type (TT) requesting DNS resolution.

37. The number portability node in claim 28, wherein the circuit-switched node is gateway mobile switching center (GMSC) which queries the number portability database using intelligent network application part (INAP) protocol and a specific service by requesting DNS resolution.

38. The number portability node in claim 28, wherein the called entity has a corresponding Mobile Subscriber Integrated Services Digital network Number (MSISDN) and an International Mobile Subscriber Identity (IMSI), the electronic processing circuitry being configured to administer in the DNS a relationship between the mobile subscriber's MSISDN and IMSI.

39. The number portability node in claim 38, wherein the electronic processing circuitry is configured to change the MSISDN for the called entity to the IMSI for the called entity using so that the IMSI may be used to route the call to the called entity.

40. The number of portability node in claim 28 including a computer usable medium having computer readable code embodied therein including:

code to receive an E.164 type number in a signaling system number 7 (SS7) message;

code to generate and send to a domain naming system (DNS) server a DNS resolution request for the E.164 type number ; and code to return a resolution response that provides information regarding whether the E.164 number is a ported number.

41. The computer-readable product according to claim 40, wherein the DNS request is an ENUM query and the resolution response includes an NAPTR record associated with the E.164 number.

42. The computer-readable product according to claim 40, wherein the information is a prefix needed to route the E.164 number.

43. The computer-readable product according to claim 40, wherein the SS7 message is a send routing information (SRI) message which includes a DNS resolution request in a translation type (TT) field.

44. The computer-readable product according to claim 43, wherein the SS7 message is an (IDP) message which includes a DNS resolution request in a service key.

* * * * *